(12) United States Patent
Ayrignac et al.

(10) Patent No.: US 7,689,864 B2
(45) Date of Patent: Mar. 30, 2010

(54) PROCESSOR COMPRISING AN INTEGRATED DEBUGGING INTERFACE CONTROLLED BY THE PROCESSING UNIT OF THE PROCESSOR

(75) Inventors: Renaud Ayrignac, La Riviere (FR); Xavier Robert, Saint Georges de Commiers (FR)

(73) Assignee: STMicroelectronics SA, Montrouge (FR)

( * ) Notice: Subject to any disclaimer, the term of this patent is extended or adjusted under 35 U.S.C. 154(b) by 449 days.

(21) Appl. No.: 11/671,661

(22) Filed: Feb. 6, 2007

(65) Prior Publication Data
US 2007/0220331 A1    Sep. 20, 2007

(30) Foreign Application Priority Data
Feb. 8, 2006    (FR)    ................................. 06 01091

(51) Int. Cl.
*G06F 11/00*    (2006.01)
(52) U.S. Cl. .......................................... 714/28; 714/25
(58) Field of Classification Search .................. 714/28, 714/25, 27, 29, 30–32, 724, 733–734; 712/225
See application file for complete search history.

(56) References Cited

U.S. PATENT DOCUMENTS

| 5,530,804 | A  | * | 6/1996 | Edgington et al. | ............. | 714/30 |
| 6,367,032 | B1 | * | 4/2002 | Kasahara | ...................... | 714/25 |
| 6,668,339 | B1 | * | 12/2003 | Maeda | ........................ | 714/38 |

FOREIGN PATENT DOCUMENTS

EP    1091298    4/2001

\* cited by examiner

*Primary Examiner*—Dieu-Minh Le
(74) *Attorney, Agent, or Firm*—Lisa K. Jorgenson; E. Russell Tarleton; Seed IP Law Group PLLC

(57) ABSTRACT

The systems and methods disclosed relate to a processor comprising a processing unit and a debugging that which can be connected to an external emulator for debugging a program executed by the processor, the debugging interface including internal resources at least partially accessible to the external emulator. According to one embodiment, the debugging interface includes a selecting circuit for selecting an internal resource of the debugging interface, according to a reference supplied by the processing unit, and an access circuit that transfers a datum between the resource selected and a data field accessible by the processing unit.

17 Claims, 3 Drawing Sheets

PROCESSOR COMPRISING AN INTEGRATED DEBUGGING INTERFACE CONTROLLED BY THE PROCESSING UNIT OF THE PROCESSOR

BACKGROUND OF THE INVENTION

1. Field of the Invention

The present invention relates to processors (microprocessors or microcontrollers) and more particularly to a debugging interface integrated into a processor.

2. Description of the Related Art

Such a debugging interface enables an external emulator to be connected to the processing unit of the processor and instructions to be executed to be sent to it. The processor comprises a debugging mode in which the debugging interface is active and provides the processing unit with instructions received from the external emulator. The instructions supplied to the processor by the debugging interface then replace the instructions coming from the program memory.

For this purpose, the debugging interface generally comprises a set of internal data transfer, control and status registers, which are accessible to the external emulator through an external port. The external port conforms, for example, to the standard IEEE 1149.1 also referred to as JTAG (Joint Test Access Group). The control register stores commands received from the external emulator to be applied to the debugging interface. The status register supplies the external emulator with information about the status of the debugging interface. The data transfer registers save data and commands to be executed by the processing unit, coming from the external emulator, and data coming from the processing unit towards the external emulator.

BRIEF SUMMARY OF THE INVENTION

One embodiment enables the processing unit of the processor to read- and/or write-access the internal registers of the debugging interface, particularly when no external emulator is connected to the debugging interface. This can be achieved by allocating an address of the addressable space of the processor to each of the internal registers of the debugging interface, to be made accessible.

Figure 1:
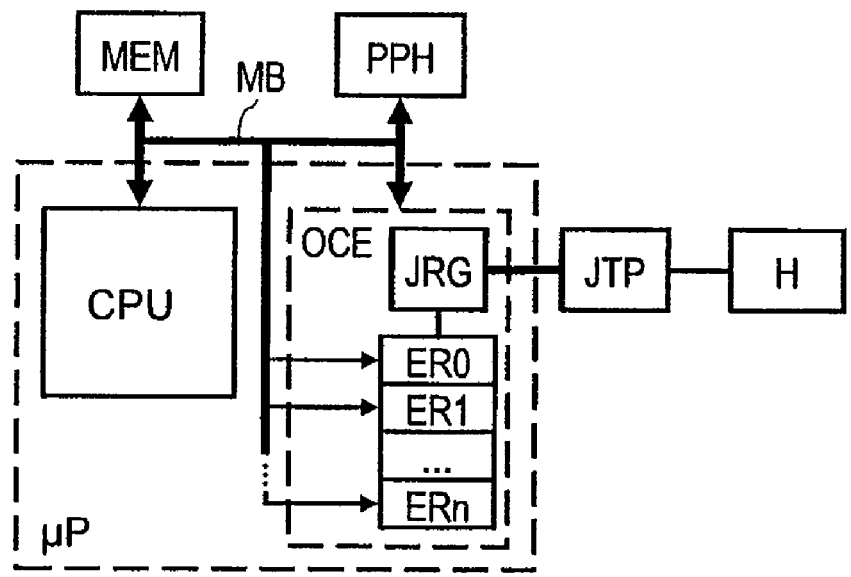

One embodiment is shown in FIG. 1 representing in block form a processor μP connected to an external emulator H through a connection port JTP for example of JTAG-type. The processor comprises a central processing unit CPU and a debugging interface OCE, connected by a bus MB to an external memory MEM and to peripheral units PPH. The debugging interface OCE comprises internal registers ER0, ER1, ... ERn, read- and write-accessible from the external environment of the processor, through a bus interface unit JRG connected to the connection port JTP.

Each of the internal registers ER0, ER1, ... ERn of the debugging interface OCE is connected directly to the communication bus MB between the processing unit CPU, the internal or external memory MEM of the processor μP, and the peripheral units PPH.

In classic architectures of the processors, the access bus for accessing the memory and the peripheral units is often a critical path which can penalize the performances of the system. The embodiment shown in FIG. 1 helps to further load the access bus for accessing the memory. In terms of number of components implemented, this solution is not optimal either.

Another embodiment makes the internal registers of the debugging interface read- and/or write-accessible to the processing unit of the processor, without further loading the access bus for accessing the memory of the processor, and while limiting the number of additional components required.

One embodiment provides a processor comprising a processing unit and a debugging interface which can be connected to an external emulator for debugging a program executed by the processor, the debugging interface comprising internal resources at least partially accessible to the external emulator.

According to one embodiment, the debugging interface comprises a selecting circuit for selecting an internal resource of the debugging interface, according to a reference supplied by the processing unit, and access means for transferring a datum between the resource selected and a data field accessible by the processing unit.

According to one embodiment, the debugging interface comprises means for loading into the data field a datum contained in the internal resource selected, when a read mode is selected.

According to one embodiment, the debugging interface comprises means for loading into the resource selected, a datum contained in the data field, when a write mode is selected.

According to one embodiment, the debugging interface comprises a communication register accessible by the processing unit, the communication register comprising the data field, an address field for receiving the reference of the internal resource to be selected, and a control field for receiving a command specifying a write- or read-access mode for accessing the internal resource selected by the reference appearing in the address field.

According to one embodiment, the communication register is also accessible to the external emulator for accessing the internal resources of the debugging interface.

According to one embodiment, the internal resources of the debugging interface comprise a set of registers.

According to one embodiment, the internal resources of the debugging interface comprise a command acting on the operation of the processing unit.

According to one embodiment, the internal resources of the debugging interface comprise a monitoring command for monitoring a specific event occurring in the processing unit.

One embodiment relates to a method for accessing by a processing unit of a processor internal resources of a debugging interface integrated into the processor and which can be connected to an external emulator for debugging a program executed by the processor, the internal resources being at least partially accessible to the external emulator.

According to one embodiment, the method comprises steps performed by the debugging interface of:

selecting an internal resource of the debugging interface, according to a reference supplied by the processing unit, and transferring a datum between the internal resource selected and a data field accessible by the processing unit.

According to one embodiment, the method comprises steps of selecting a read mode, and of loading into the data field a datum contained in the internal resource selected.

According to one embodiment, the method comprises steps of selecting a write mode, and of loading into the internal resource selected, a datum contained in the data field.

According to one embodiment, the method comprises a step of selecting a write- or read-access mode for accessing the internal resource selected by the address field, according to a command supplied by the processing unit to the debugging interface.

According to one embodiment, the processing unit writes in a communication register of the debugging interface, the communication register comprising the data field, an address field for receiving the reference of the internal resource to be selected, and a control field for receiving a command specifying a write- or read-access mode for accessing the internal resource selected by the reference appearing in the address field.

According to one embodiment, the external emulator accesses the internal registers of the debugging interface through the communication register.

According to one embodiment, the internal resources of the debugging interface comprise a set of registers.

According to one embodiment, the internal resources of the debugging interface comprise a command acting on the operation of the processing unit.

According to one embodiment, the internal resources of the debugging interface comprise a monitoring command for monitoring a specific event occurring in the processing unit.

BRIEF DESCRIPTION OF THE SEVERAL VIEWS OF THE DRAWING(S)

Figure 2:
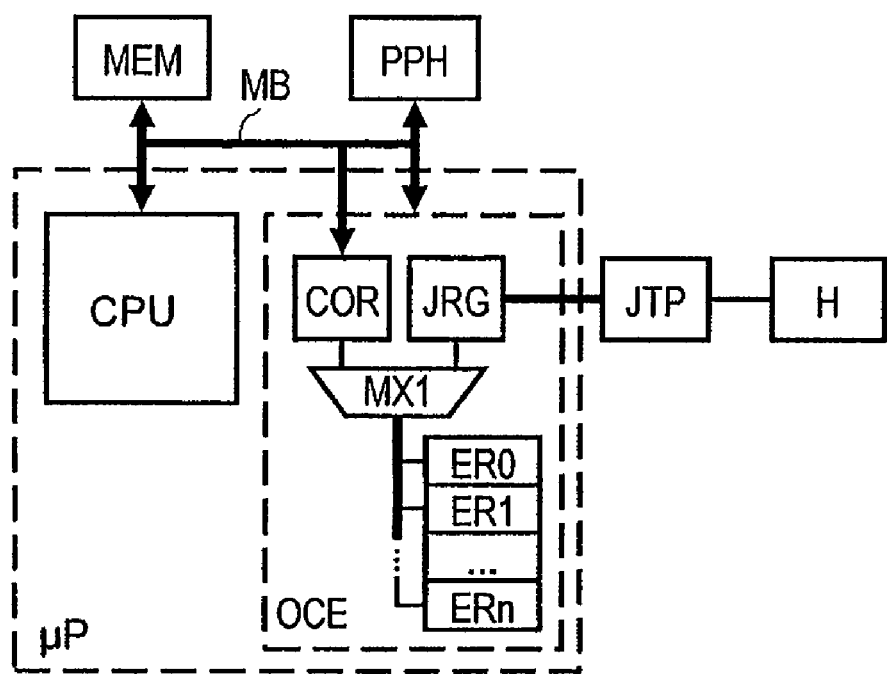
Figure 3:
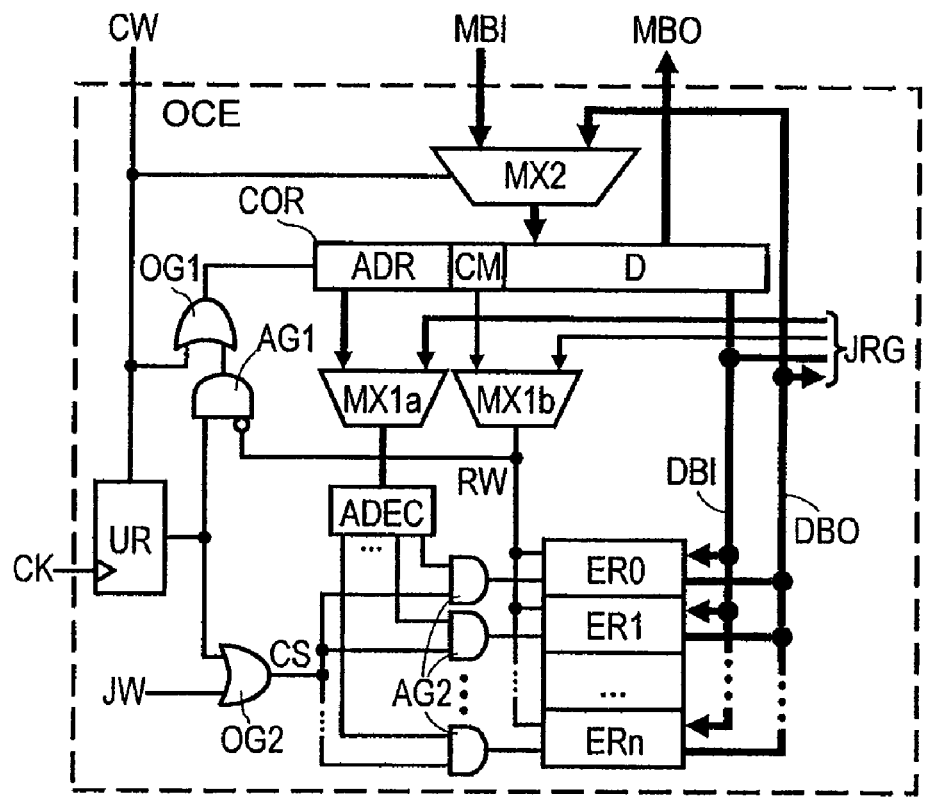
Figure 4:
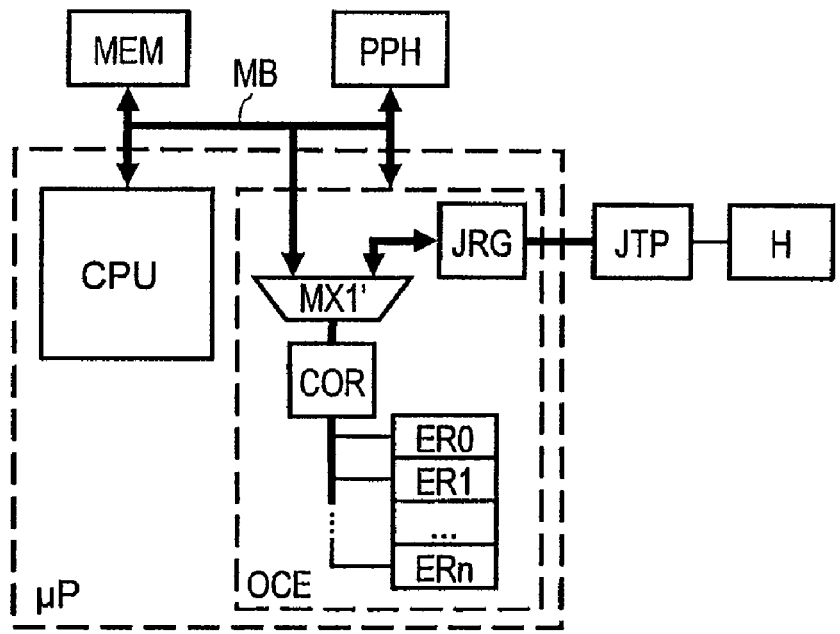
Figure 5:
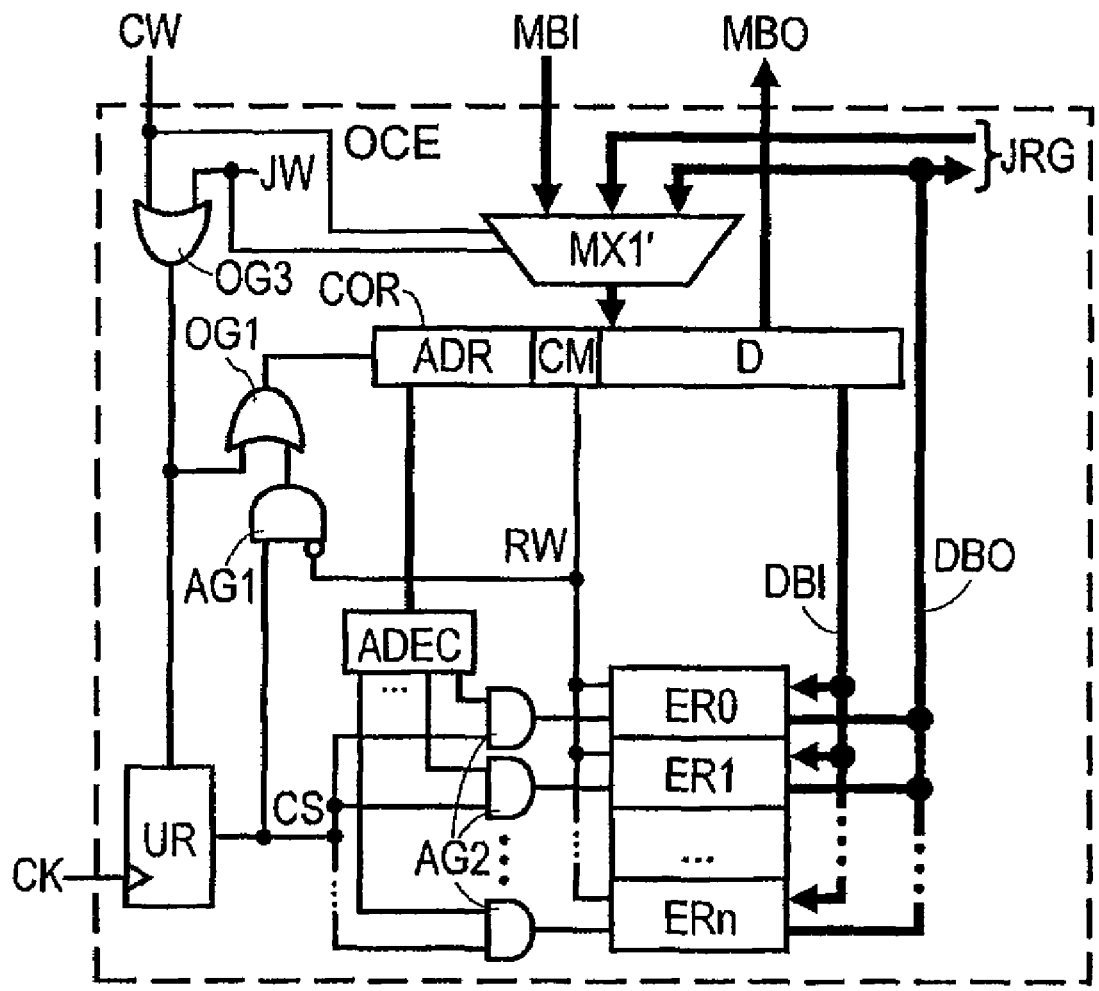

These and other features and advantages of the present invention will be explained in greater detail in the following description of various embodiments, given in relation with, but not limited to the following figures, in which:

FIG. 1 already described represents in block form an architecture of a processor comprising a debugging interface, according to previous practices, FIG. 2 represents in block form an architecture of a processor comprising a debugging interface, according to a first embodiment, FIG. 3 is a wiring diagram of the debugging interface represented in FIG. 2, according to one embodiment, FIG. 4 represents in block form an architecture of a processor comprising a debugging interface, according to a second embodiment, FIG. 5 is a wiring diagram of the debugging interface represented in FIG. 4, according to one embodiment.

DETAILED DESCRIPTION OF THE INVENTION

FIG. 2 represents a processor μP connected to an external emulator H through a connection port JTP for example of JTAG-type. The processor comprises a central processing unit CPU and a debugging interface OCE, connected by a communication bus MB to an external memory MEM and to peripheral units PPH. The interface OCE comprises internal registers ER0, ER1, ... ERn, read- and write-accessible from the external environment of the processor through a bus interface unit JRG connected to the connection port JTP.

According to a first embodiment, each of the internal registers ER0-ERn of the interface OCE is linked to a communication register COR of the test interface and to the bus interface unit JRG through a multiplexer MX1. The register COR is accessible directly from the bus MB.

Thus, the processing unit CPU can supply in the register COR a datum to be written and an address of an internal register ER0-ERn in which the datum must be written. Using this information, the debugging interface can determine the write operation to be performed in an internal register.

Similarly, the unit CPU can supply in the register COR an address of an internal register ER0-ERn to be read. The debugging interface can then read the register corresponding to the address received and write the datum read in the register COR. The processing unit can then read the register COR to obtain the value read in the internal register corresponding to the address supplied.

These write and read operations are possible without the internal registers ER0-ERn having an address in the space addressable by the bus MB.

FIG. 3 is a wiring diagram of one embodiment of the debugging interface OCE represented in FIG. 2. FIG. 3 represents the communication register COR linked to the internal registers ER0-ERn of the interface OCE through the multiplexer MX1 produced by two multiplexers MX1a and MX1b. The bus MB comprises two unidirectional buses MBI, MBO in opposite directions. The bus MBI is linked to the register COR through a multiplexer MX2. The bus MBO is connected to the register COR. The register COR comprises an address field ADR, a data field D and an access mode field CM, indicating whether the register selected by the address field must be write- or read-accessed.

The inputs of the multiplexer MX1a are connected to the address field ADR and to the bus interface unit JRG. The inputs of the multiplexer MX1b are connected to the field CM and to the unit JRG. The output of the multiplexer MX1b is connected to a selection input for selecting the write/read mode of the registers ER0-ERn. The registers ER0-ERn are connected to the field D of the register COR and to the unit JRG through two unidirectional data buses DBI and DBO in opposite directions. The bus DBO is connected to an input of the multiplexer MX2 controlled by the signal CW. By default (signal CW on 0), the multiplexer MX2 transmits the datum present on the bus DBO into the register COR. When the control signal CW is on 1, the multiplexer MX2 transmits the datum present on the bus MBI to the register COR.

The interface OCE also comprises an address decoder ADEC connected to the output of the multiplexer MX1a and a flip-flop UR receiving at input a write control signal CW for writing the register COR, coming from the processing unit CPU, and at its clock input the clock signal of the processor μP. The decoder ADEC comprises one selection signal output per internal register ER0-ERn to be accessed. Each selection signal output of the decoder ADEC is connected to the input of an AND-type logic gate AG2, another input of which receives the output signal CS of the flip-flop UR through an OR-type logic gate OG2. The output of each gate AG2 is connected to a selection input of one of the registers ER0-ERn. Another input of the gate OG2 receives a write control signal JW coming from the unit JRG. Thus, the decoder ADEC selects an internal register ER0-ERn according to the address supplied in the field ADR when the output of the flip-flop UR or the signal JW is on 1.

The output of the flip-flop UR is also connected to the input of an AND-type logic gate AG1, another inverted input of which receives the output signal of the multiplexer MX1b. The output of the gate AG1 is connected to an input of an OR-type logic gate OG1, another input of which receives the signal CW. The output of the gate OG1 is connected to a write command input of the register COR.

When the unit CPU writes a command in the register COR through the bus MBI, it sets the signal CW to 1. The output signal CS of the flip-flop UR then changes to 1 upon the next rising edge of the clock signal CK. The register ER0-ERn is selected according to the field ADR of the register COR, and the access mode for accessing the register is selected thanks to the field CM.

If the field CM is on 1 indicating a write command for writing the register ER0-ERn selected, the datum appearing in the field D is transferred into the write-selected register through the bus DBI.

If the field CM is on 0 indicating a read command for reading the selected register, the datum appearing in the selected register ER0-ERn is transferred on the bus DBO. Furthermore, the flip-flop UR the status of which is on 1 maintains the register COR in write mode. In parallel, the signal CW changes back to 0. As a result, the datum present on the bus DBO is transferred into the field D of the register COR by the multiplexer MX2. The datum read in the selected register is therefore accessible to the unit CPU through the bus MBO, in the field D of the register COR, upon the next clock cycle. The unit CPU can therefore send a read command for reading an internal register ER0-ERn by executing a write instruction at the address of the register COR, followed by a read instruction for reading that same address of the register COR. If the debugging interface OCE is not capable of supplying the datum to be read in one clock cycle, it is sufficient to insert as many NOP instructions (No Operation) as necessary between the write instruction and the read instruction.

Thanks to the multiplexers MX1a and MX1b and to the signal JW, an analog command coming from the interface unit JRG is processed in the manner described previously by the circuit represented in FIG. 3. However, it is not necessary in this case to maintain the register COR in write mode in the case of a read command for reading one of the registers ER0-ERn.

It shall be noted that the values of the addresses of the registers ER0-ERn, which can be written in the address field, are the same as those used by the debugging interface OCE to access these registers.

The disclosed systems and methods supply the processing unit CPU with an access to the debugging interface OCE particularly when the latter is not connected to an external emulator H. The two access paths, firstly through the register COR and secondly through the interface unit JRG, are therefore exclusive. The multiplexer MUX1 (MUX1a, MUX1b) then performs an OR logic function.

However, it can be advantageous to authorize the two simultaneous accesses, by giving priority, for example, to the processing unit CPU that communicates with the interface OCE much more rapidly than the external emulator. In this case, if an access coming from the external emulator H appears during an access of the unit CPU, the access coming from the emulator H is lost. However, it may be desirable not to lose any access. In one embodiment, an additional register stores the access requests coming from the external emulator H.

Any conflicts between the accesses coming from the unit CPU and from the external emulator H can be managed using a list of the internal registers ER0-ERn accessed by the processing unit during the execution of a program. The external emulator must then ensure that these registers are not used during the debugging of the program.

FIG. 4 represents a second embodiment of the processor. FIG. 4 is identical to FIG. 2, except that the register COR is not accessible directly from the bus MB but through a multiplexer MX1', and the register COR is linked to the rest of the circuit without going through a multiplexer such as MX1. Another input of the multiplexer MX1' is connected to the bus interface unit JRG.

In the embodiment shown in FIG. 4, the unit CPU can supply in the register COR a datum to be written and an address of an internal register ER0-ERn in which the datum must be written. Using this information, the debugging interface OCE can determine the write operation to be performed in an internal register.

Similarly, the processing unit CPU can also supply in the register COR an address of an internal register ER0-ERn to be read. The interface OCE can then, in the same way, transfer the content of the register corresponding to the address received into the register COR. The processing unit can then read the register COR to obtain the value read in the internal register corresponding to the address supplied.

These write and read operations are also possible without the internal registers ER0-ERn having an address in the space addressable by the bus MB.

FIG. 5 is a wiring diagram of one embodiment of the debugging interface OCE represented in FIG. 4. FIG. 5 represents the communication register COR, linked to the internal registers ER0-ERn of the interface OCE. The bus MB comprises two unidirectional buses MBI, MBO in opposite directions. The bus MBI is linked to the register COR through the multiplexer MX1', while the bus MBO is connected to the register COR. One input of the multiplexer MX1' is connected to the unit JRG. The register COR comprises an address field ADR, a data field D and an access mode field CM, indicating whether the register selected by the address field must be write- or read-accessed.

The field CM of the register COR is connected to a write/read mode selection input of the registers ER0-ERn. The registers ER0-ERn are connected to the field D of the register COR and to the unit JRG through two unidirectional data buses DBI and DBO in opposite directions. The bus DBO is connected to an input of the multiplexer MX1' controlled by the signals CW and JW. By default (signals CW and JW on 0), the multiplexer MX1' transmits the datum present on the bus DBO into the register COR. When the control signal CW is on 1, the multiplexer MX1' transmits the datum present on the bus MBI to the register COR. When the control signal JW is on 1, the multiplexer MX1' transmits the datum supplied by the unit JRG to the register COR.

The debugging interface OCE also comprises an address decoder ADEC receiving the content of the address field ADR, and a flip-flop UR receiving at its clock input the clock signal of the processor µP, and one input of which is connected to an OR-type logic gate OG3. The gate OG3 applies to the flip-flop UR a write control signal CW, JW for writing the register COR coming from the processing unit CPU, or from the interface OCE.

The address decoder ADEC comprises one selection signal output per internal register ER0-ERn to be accessed. Each selection signal output of the decoder ADEC is connected to the input of an AND-type logic gate AG2, another input of which receives the output signal CS of the flip-flop UR. The output of each gate AG2 is connected to a selection input of one of the registers ER0-ERn. Thus, the decoder ADEC selects an internal register ER0-ERn according to the address supplied in the field ADR when the output of the flip-flop UR is on 1.

The output of the flip-flop UR is also connected to the input of an AND-type logic gate AG1, another inverted input of which receives the value of the field CM of the register COR. The output of the gate AG1 is connected to one input of an OR-type logic gate OG1, another input of which is connected to the output of the gate OG3. The output of the gate OG1 is connected to a write selection input of the register COR.

When the unit CPU writes a command in the register COR through the bus MBI, it sets the signal CW to 1. The flip-flop UR then changes to the 1 status upon the next rising edge of the clock signal CK. The register ER0-ERn is selected according to the field ADR of the register COR, and the access mode for accessing the register selected is controlled thanks to the field CM.

If the field CM is on 1 indicating a write command for writing the register ER0-ERn selected, the datum appearing in the field D is transferred into the write-selected and -controlled register through the bus DBI.

If the field CM is on 0 indicating a read command for reading the selected register, the datum appearing in the selected register is transferred on the bus DBO. Furthermore, the output of the flip-flop UR linked to the write mode selection input through the gates AG1 and OG1 maintains the register COR in write mode. As a result, the datum present on the bus DB is transferred into the field D of the register COR through the multiplexer MX1'.

Thanks to the multiplexer MX1' and to the signal JW, an analog command coming from the interface unit JRG is processed in the manner described previously by the circuit represented in FIG. 5.

In one alternative embodiment, the data input of the unit JRG is connected, not to the bus DBO, but to the bus MBO.

Compared to the first embodiment described with reference to FIGS. 3 and 4, the second embodiment offers the advantage of providing the unit CPU with access to the commands sent by the external emulator H and to the result of the execution of these commands.

It shall be noted that in the two embodiments described with reference to FIGS. 3 and 5, the number of additional components to be provided to access the internal resources of the debugging interface is significantly reduced. In addition, a large part of these components is used both by the processing unit and the external emulator.

It will be understood by those skilled in the art that various alternative embodiments are possible. In particular, the disclosed systems and methods do not apply solely to accessing internal registers. Rather, they apply more generally to any access to an internal resource of the debugging interface OCE. Thus, this principle can be applied for example to the provision of configuration commands (initialization, for example) acting on the operation of the processing unit CPU, which are provided in the interface OCE. The processing unit can thus configure itself. Generally speaking, the communication register COR can be used to modify or read the status of any internal signal of the interface OCE.

The interface OCE may also comprise a resource enabling specific events which can occur in the processing unit to be monitored. Such an event is, for example, the access of the processing unit to a specific address. Thanks to the disclosed systems and methods, the processing unit can access this resource to order the interface OCE to monitor specific events, and access a status register of the interface OCE to determine whether or not an event thus monitored has occurred.

It is not necessary either for the access to the resources of the interface OCE, which is supplied to the processing unit CPU, to be bi-directional. The access to the resources of the interface OCE can be limited simply to the modification or to the consultation of the content of registers or to the value of internal signals.

Furthermore, the resources the processing unit accesses are not necessarily all accessible to the external emulator H. Certain signals appearing in intermediate processing operations can be made accessible to the processing unit. Conversely, it may not be necessary to provide the processing unit with access to all the resources of the debugging interface accessible to the external emulator.

The invention claimed is:

1. A processor for use with an external emulator, comprising:
   a processing unit; and
   a debugging interface that can be connected to the external emulator for debugging a program executed by the processor, the debugging interface including
      internal registers at least partially accessible to the external emulator;
      a selecting circuit for selecting one of the internal registers of the debugging interface, according to a reference supplied by the processing unit;
      an access circuit for transferring a datum between the internal register selected and a data field accessible by the processing unit; and
      a communication register circuit coupled to the internal registers and to the processing unit, the communication register comprising the data field, an address field for receiving the reference of the internal register to be selected, and a control field for receiving a command specifying a write-access or read-access mode for accessing via a multiplexor the internal register selected by the reference appearing in the address field.

2. The processor according to claim 1, wherein the communication register circuit includes a circuit for loading into the data field a datum contained in the internal register selected, when a read mode is selected.

3. The processor according to claim 1, wherein the communication register circuit includes a circuit for loading into the internal register selected, a datum contained in the data field, when a write mode is selected.

4. The processor according to claim 1, wherein the communication register circuit is also accessible to the external emulator for accessing the internal registers of the debugging interface.

5. The processor according to claim 1, wherein the internal registers of the debugging interface comprise a command for acting on the operation of the processing unit.

6. The processor according to claim 1, wherein the internal registers of the debugging interface comprise a monitoring command for monitoring a specific event occurring in the processing unit.

7. A method for accessing by a processing unit of a processor internal resources of a debugging interface integrated into the processor and which can be connected to an external emulator for debugging a program executed by the processor, the internal resources being at least partially accessible to the external emulator, the method, performed by the debugging interface, comprising:
   selecting an internal resource of the debugging interface, according to a reference supplied by the processing unit to a communications register coupled between the internal resource and the processing unit; and
   transferring a datum between the internal resource selected and a data field accessible by the processing unit in the communications register.

8. The method according to claim 7, further comprising:
   selecting a read mode; and
   loading into the data field, a datum contained in the internal resource selected.

9. The method according to claim 7, further comprising:
   selecting a write mode; and
   loading into the internal resource selected, a datum contained in the data field.

10. The method according to claim 7, further comprising:
selecting a write-access or read-access mode for accessing the internal resource selected by the address field, according to a command supplied by the processing unit to the debugging interface.

11. The method according to claim 7, wherein the communication register includes the data field, an address field for receiving the reference of the internal resource to be selected, and a control field for receiving a command specifying a write-access or read-access mode for accessing via a multiplexer the internal resource selected by the reference appearing in the address field.

12. The method according to claim 11, wherein the external emulator accesses the internal registers of the debugging interface through the communication register.

13. The method according to claim 7, wherein the internal resources of the debugging interface include a set of registers.

14. The method according to claim 7, wherein the internal resources of the debugging interface include a command acting on the operation of the processing unit.

15. The method according to claim 7, wherein the internal resources of the debugging interface include a monitoring command for monitoring a specific event occurring in the processing unit.

16. A circuit, comprising:
debugging interface for a processor, the debugging interface comprising:
internal registers at least partially accessible to an external emulator for debugging a program executable on the processor;
a selection circuit configured to select one of the internal registers based on a reference supplied by a processing unit of the processor to a communications register coupled between the internal registers and the processing unit; and
a transfer circuit configured to transfer data between the selected internal register and a data field accessible by the processing unit.

17. The circuit of claim 16, further comprising:
an external emulator accessing the internal registers of the debugging device through the communication register.

* * * * *